US012803092B2

(12) United States Patent
He et al.

(10) Patent No.: US 12,803,092 B2
(45) Date of Patent: Nov. 17, 2026

(54) BATTERY PACK AND ELECTRIC VEHICLE

(71) Applicant: BYD COMPANY LIMITED, Shenzhen (CN)

(72) Inventors: Long He, Shenzhen (CN); Huajun Sun, Shenzhen (CN); Zhipei Lu, Shenzhen (CN); Long Wan, Shenzhen (CN); Yan Zhu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 863 days.

(21) Appl. No.: 17/780,892

(22) PCT Filed: Oct. 22, 2020

(86) PCT No.: PCT/CN2020/122882
§ 371 (c)(1),
(2) Date: May 27, 2022

(87) PCT Pub. No.: WO2021/103867
PCT Pub. Date: Jun. 3, 2021

(65) Prior Publication Data
US 2023/0023909 A1 Jan. 26, 2023

(30) Foreign Application Priority Data
Nov. 29, 2019 (CN) ......................... 201911198132.9

(51) Int. Cl.
*H01M 50/209* (2021.01)
*H01M 50/236* (2021.01)
(Continued)

(52) U.S. Cl.
CPC ....... *H01M 50/209* (2021.01); *H01M 50/236* (2021.01); *H01M 50/244* (2021.01);
(Continued)

(58) Field of Classification Search
CPC ............ H01M 50/209; H01M 50/249; H01M 50/26; H01M 50/244; H01M 50/236
See application file for complete search history.

(56) References Cited

U.S. PATENT DOCUMENTS

2014/0038030 A1* 2/2014 Goesmann ........ H01M 10/0481 429/157
2015/0072209 A1* 3/2015 Tyler ....................... B60L 50/16 429/159
(Continued)

FOREIGN PATENT DOCUMENTS

CN 107994149 A 5/2018
CN 108321314 A 7/2018
(Continued)

OTHER PUBLICATIONS

International Search Report and Written Opinion for Application No. PCT/CN2020/122882, mailed on Jan. 27, 2021, 10 pages.
(Continued)

*Primary Examiner* — Jonathan G Jelsma
(74) *Attorney, Agent, or Firm* — Sheppard Mullin Richter & Hampton LLP

(57) ABSTRACT

A battery pack and an electric vehicle are provided. The battery pack includes a cell array and two first reinforcing plates. The cell array includes a number of cells. Each of the cells is defined with a length L, a thickness D, and a height H between the length L and the thickness D. The number of cells are arranged along a thickness direction, and the cells are adhered to each other by a structural adhesive. The two first reinforcing plates are arranged opposite to each other and are respectively adhered to two surfaces of the cell array along the arrangement direction of the cells, and are configured to constrain relative positions between the cells.

21 Claims, 8 Drawing Sheets

(51) Int. Cl.
*H01M 50/244* (2021.01)
*H01M 50/249* (2021.01)
*H01M 50/26* (2021.01)

(52) U.S. Cl.
CPC ......... *H01M 50/249* (2021.01); *H01M 50/26* (2021.01); *H01M 2220/20* (2013.01)

(56) References Cited

U.S. PATENT DOCUMENTS

| | | | | |
|---|---|---|---|---|
| 2015/0255764 | A1* | 9/2015 | Loo | B60L 50/64 429/149 |
| 2016/0093849 | A1* | 3/2016 | DeKeuster | H01M 50/209 429/61 |
| 2016/0351980 | A1 | 12/2016 | Herntier et al. | |
| 2019/0097202 | A1* | 3/2019 | Morone | H01M 50/583 |
| 2020/0212388 | A1* | 7/2020 | Chen | H01M 50/264 |
| 2021/0175572 | A1* | 6/2021 | He | H01M 10/625 |

FOREIGN PATENT DOCUMENTS

| | | | | |
|---|---|---|---|---|
| CN | 208797084 | U | 4/2019 | |
| CN | 110165116 | A | 8/2019 | |
| CN | 110190228 | A | 8/2019 | |
| CN | 209561492 | U | 10/2019 | |
| CN | 112117400 | A | 12/2020 | |
| EP | 2530763 | A1 | 5/2012 | |
| EP | 2696389 | A1 * | 2/2014 | H01M 50/209 |
| JP | S6357131 | A | 3/1988 | |
| JP | 2009295381 | A | 12/2009 | |
| JP | 2012043758 | A | 3/2012 | |
| JP | 2013012464 | A | 1/2013 | |
| JP | 2013114953 | A | 6/2013 | |
| JP | 2014517995 | A | 7/2014 | |
| JP | 2015-022798 | A | 2/2015 | |
| JP | 2016146073 | A | 8/2016 | |
| JP | 2018-510463 | A | 4/2018 | |
| JP | 6859323 | B2 | 11/2018 | |
| JP | 2019-003886 | A | 1/2019 | |
| JP | 2019087377 | A | 6/2019 | |
| JP | D1651875 | S | 1/2022 | |
| WO | 2006/030659 | A1 | 3/2006 | |
| WO | 2015/196046 | A1 | 12/2015 | |
| WO | 2017/163359 | A1 | 9/2017 | |
| WO | 2017056742 | A1 | 7/2018 | |
| WO | 2019/001357 | A1 | 1/2019 | |

OTHER PUBLICATIONS

First Search dated Feb. 16, 2022, issued in Chinese Patent Application No. 201911198132.9 (1 page).

Extended European Search Report dated Dec. 12, 2022, issued in European Patent Application No. 20893130.3 (9 pages).

Notice of Reasons for Refusal dated Oct. 21, 2025, issued in Japanese Patent Application No. 2024-061252, with English machine translation (14 pages).

Notice of Reasons for Refusal dated Jun. 27, 2023, issued in Japanese Patent Application No. 2022-531447, with English machine translation (12 pages).

Decision of Refusal dated Dec. 5, 2023, issued in Japanese Patent Application No. 2022-531447, with English machine translation (6 pages).

Notice of Reasons for Refusal dated Oct. 29, 2024, issued in Japanese Patent Application No. 2022-531447, with English machine translation (14 pages).

Request for the Submission of an Opinion dated Aug. 23, 2024, issued in Korean Patent Application No. 10-2022-7017471, with English machine translation (20 pages).

Notice of Final Rejection dated Feb. 11, 2025, issued in Korean Patent Application No. 10-2022-7017471, with English machine translation (5 pages).

* cited by examiner

100

BATTERY PACK AND ELECTRIC VEHICLE

CROSS-REFERENCE TO RELATED APPLICATION

This application is a National Phase Application of International Patent Application No. PCT/CN2020/122882, filed on Oct. 22, 2020, which is based on and claims priority to and benefits of Chinese Patent Application No. 201911198132.9, entitled "BATTERY PACK AND ELECTRIC VEHICLE" and filed on Nov. 29, 2019. The entire content of all of the above-referenced applications is incorporated herein by reference.

FIELD

The present disclosure relates to the field of batteries, and specifically to a battery pack and an electric vehicle.

BACKGROUND

In the related art, a battery pack includes a tray and a sealing cover. A battery module is arranged in an accommodating chamber defined by the tray and the sealing cover. The tray includes a bottom plate and side beams connected around the bottom plate. In order to increase the rigidity and strength of the tray, reinforcing transverse beams and/or longitudinal beams are arranged in the tray. The battery module is fixed to the transverse beams and/or the longitudinal beams by screws or other structural members. Since the batteries and the structural members are scattered inside the battery pack and assembled together by fasteners or adhesion, such a battery pack is not of high integrity at the system level. After the battery pack is installed on a vehicle, the structure of the battery pack alone cannot satisfy the mechanical safety performance at the vehicle level, and the structure of the battery pack needs to be supported and protected by the frame of the vehicle. As a result, compact and light-weight design cannot be achieved for the battery pack and the vehicle at present, resulting in higher overall costs and a complex structural design of the vehicle and the battery pack.

SUMMARY

In order to solve at least one of the technical problems mentioned above, according to a first aspect of the present disclosure, a battery pack is provided. The battery pack includes a cell array and two first reinforcing plates. The cell array includes a number of cells. Each of the cells is defined with a length L, a thickness D, and a height H between the length L and the thickness D. The number of cells are arranged along a thickness direction, and the cells are adhered to each other by a structural adhesive. The two first reinforcing plates are arranged opposite to each other and are respectively adhered to the two surfaces of the cell array along an arrangement direction of the cells, and are configured to constrain relative positions between the cells.

In some implementations of the present disclosure, the two first reinforcing plates are respectively adhered to two opposite surfaces of the cells along a height direction.

In some implementations of the present disclosure, at least one of the cells satisfies: 600 mm $\leqslant$ L $\leqslant$ 2500 mm, and 10 $\leqslant$ L/D $\leqslant$ 208.

In some implementations of the present disclosure, the battery pack includes a number of layers of cell arrays arranged along a height direction of the cells, a partition plate is arranged between two neighboring layers of cell arrays, and the partition plate is fixedly adhered to the cell arrays on two sides of the partition plate.

In some implementations of the present disclosure, a second reinforcing plate is arranged between at least two neighboring cells, and the second reinforcing plate is fixedly adhered to the cells arranged on two sides of the second reinforcing plate.

In some implementations of the present disclosure, the battery pack further includes an upper cover and a tray, the tray includes a bottom plate and a side frame surrounding the bottom plate, the upper cover and the tray are connected to define a cell accommodating chamber, and the cell array is arranged in the cell accommodating chamber.

In some implementations of the present disclosure, the two first reinforcing plates constitute the upper cover and the bottom plate respectively.

In some implementations of the present disclosure, the battery pack further includes a protection plate, and the protection plate is arranged on an outer surface of the bottom plate.

In some implementations of the present disclosure, the protection plate includes two layers of aluminum plates and a steel plate or a foamed aluminum plate sandwiched between the two layers of aluminum plates.

In some implementations of the present disclosure, the protection plate includes two fiber composite layers and a foamed polymer layer sandwiched between the two fiber composite layers, and the fiber composite layer includes a glass fiber layer or a carbon fiber layer.

In some implementations of the present disclosure, outer surfaces of the two first reinforcing plates are respectively adhered to an inner surface of the upper cover and an inner surface of the bottom plate.

In some implementations of the present disclosure, at least one of the bottom plate or the upper cover includes two layers of aluminum plates and a steel plate or a foamed aluminum plate sandwiched between the two layers of aluminum plates.

In some implementations of the present disclosure, at least one of the bottom plate and the upper cover includes two fiber composite layers and a foamed polymer layer sandwiched between the two fiber composite layers, and the fiber composite layer includes a glass fiber layer or a carbon fiber layer.

In some implementations of the present disclosure, the upper cover is provided with a sealing groove at a position corresponding to the side frame, a sealant layer is arranged in the sealing groove, and the upper cover and the tray are hermetically connected by the sealant layer.

In some implementations of the present disclosure, a gap between the cell array and the side frame is filled with a structural adhesive.

In some implementations of the present disclosure, each of the cells includes a first end and a second end arranged opposite to each other along a length direction, the side frame includes a first side frame and a second side frame arranged opposite to each other along the length direction of each of the cells, the first end of each of the cells is supported by the first side frame, and the second end of each of the cells is supported by the second side frame.

In some implementations of the present disclosure, a first support step is arranged on the first side frame, a second support step is arranged on the second side frame, the first end of each of the cells is supported by the first support step, and the second end of each of the cells is supported by the second support step.

In some implementations of the present disclosure, the battery pack further includes a supporting structure, the first end of each of the cells is fitted to and supported by the first side frame through the supporting structure, and/or the second end of the cell is fitted to and supported by the second side frame through the supporting structure.

In some implementations of the present disclosure, the supporting structure includes a first support block, a lower surface of the first end of each of the cells is supported by the first side frame through the first support block, and/or a lower surface of the second end of each of the cells is supported by the second side frame through the first support block.

In some implementations of the present disclosure, the supporting structure includes a second support block, the first end of each of the cells facing the first side frame is fitted to the first side frame through the second support block; and/or the second end of each of the cells facing the second side frame is fitted to the second side frame through the second support block.

In some implementations of the present disclosure, each of the cells includes electrode terminals, the electrode terminals are respectively arranged at the first end and the second end of each of the cells, holes are provided on the supporting structure, and the electrode terminals of each of the cells extend through the holes respectively and are electrically connected by a cell connector.

In some implementations of the present disclosure, the battery pack further includes an insulation partition plate, and the insulation partition plate is arranged between the supporting structure and an inner surface of the side frame.

In some implementations of the present disclosure, the battery pack further includes a third side frame and a fourth side frame arranged opposite to each other along the arrangement direction of the cells, and the third side frame and the fourth side frame are respectively fixedly adhered to each of the cells adjacent thereto.

In some implementations of the present disclosure, a reinforcing beam is arranged on the third side frame and/or the fourth side frame, and the reinforcing beam is configured to limit expansion of the cell array.

In some implementations of the present disclosure, a thickness of the first reinforcing plate is 1-3 mm.

According to a second aspect of the present disclosure, an electric vehicle is provided, including the battery pack according to any one of the above implementations.

Compared with the prior art, the present disclosure has the following beneficial effects. In the present disclosure, the two first reinforcing plates are arranged on the two surfaces of the cell array opposite to each other along the arrangement direction of the cells, and the two first reinforcing plates are configured to constrain the relative positions between the cells, to eliminate the weak points in the gap between two neighboring cells when the cells are adhered to each other. The two first reinforcing plates and the cell array form a honeycomb-like structure, and thus, the battery pack is designed as an integral structural member of great rigidity. Such a honeycomb-like structure is of strong resistance to instability, high bending rigidity, and a significantly reduced weight. Therefore, the rigidity and strength of the battery pack are greatly enhanced, thereby improving the mechanical safety and reliability. When in use, the structural strength of the integral battery pack provides part of the structural strength of the vehicle. The battery pack can be used to enhance the structural strength of the vehicle, and the battery pack does not need to be protected by the vehicle. Such a design allows for the simplification or even removal of the structure designed for the frame of the vehicle to protect the structural strength of the battery pack, and meets the requirements for a lightweight design of the vehicle, thereby reducing the manufacturing costs and improving the efficiency of vehicle production.

REFERENCE NUMERALS

100 battery pack;
101 cell array; 1011 structural adhesive;
102 cell;
103 tray; 1031 first side frame; 1032 second side frame; 1033 third side frame; 1034 first support step; 1035 bottom plate;
104 first reinforcing plate;
105 upper cover;
106 first support block;
107 second support block; 1071 hole;
108 second reinforcing plate;
109 insulation partition plate;
110 cell connector;
111 protection plate;
X thickness direction of cell;
Y length direction of cell; and
Z height direction of cell.

DETAILED DESCRIPTION

Figure 1:
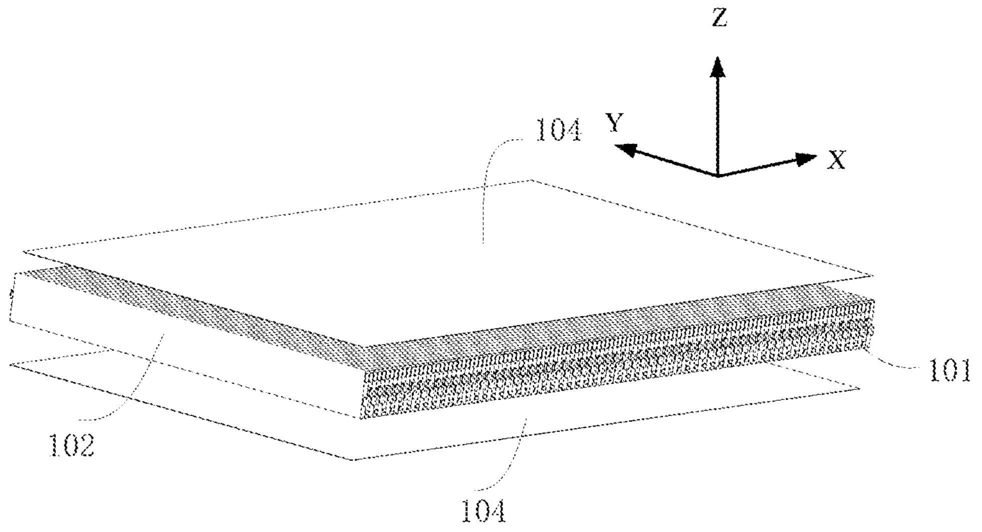
FIG. 1 is a schematic structural diagram showing adhesion of first reinforcing plates to a cell array according to the present disclosure.
Figure 2:
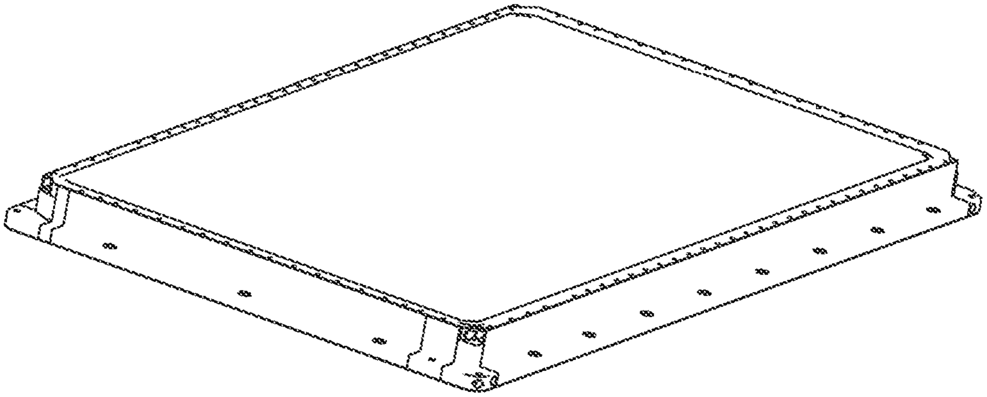
FIG. 2 is a schematic structural diagram of a battery pack according to the present disclosure.
Figure 3:
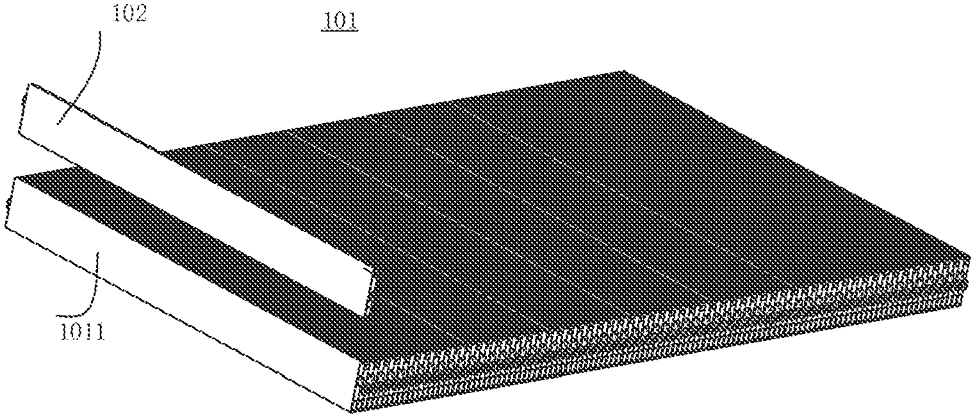
FIG. 3 is a schematic structural diagram of a cell array according to the present disclosure.
Figure 4:
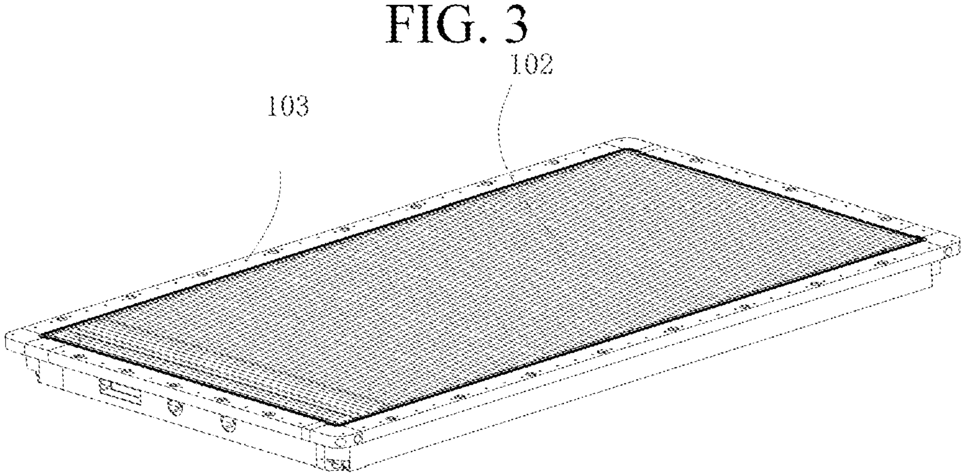
FIG. 4 is a schematic structural diagram of a cell array arranged in a tray according to the present disclosure.

As shown in FIG. 1, the present disclosure provides a battery pack 100, including a cell array 101 and two first reinforcing plates 104. The cell array 101 includes a number of cells 102. Each of the cells is defined with a length L, a thickness D, and a height H between the length L and the thickness D. The number of cells 102 are arranged along a thickness direction, and the cells 102 are adhered to each other by a structural adhesive 1011. The two first reinforcing plates 104 are arranged opposite to each other and are adhered to the two surfaces of the cell array 101 along an arrangement direction of the cells 102, and are configured to constrain relative positions between the cells 102.

In the related arts, a number of battery cells 102 are first assembled into a battery module. A number of battery modules are assembled into a battery pack 100 by fasteners or a structural adhesive. The cells and structural members in the battery pack 100 are relatively scattered, and there are many weak points in gaps between fasteners and cells, gaps between cells, and gaps between fasteners. Once the entire battery pack 100 is squeezed or impacted by an external force, these weak points will be destroyed by the external force, and the fastening effects of the fasteners and adhesive fail, resulting in upcoming damages to the entire battery pack 100.

In order to prevent the damage caused by the external force, in the related arts, the strength of the casing of the battery pack 100 is enhanced for resisting external impact by the battery pack 100. In order to enhance the strength of the battery pack 100, a bottom plate 1035 of a tray 103 is made of steel with higher strength or is made thicker. Or the tray 103 is configured as a multi-layer structure with cavities, and reinforcing ribs are arranged in the cavity structure. However, all the methods of enhancing the strength of the battery pack 100 lead to an increase in the weight of the entire battery pack 100 or a reduction in the space utilization of the battery pack 100, reducing the energy density of the battery pack 100.

In the present disclosure, the cells 102 are adhered to each other to form a cell array 101, and the two first reinforcing plates 104 are adhered to the two surfaces of the cell array 101 opposite to each other along the arrangement direction of the cells 102. The two first reinforcing plates 104 are configured to constrain the relative positions between the number of cells 102, and form an integral structure with the number of cells 102. Such an integral structure can eliminate the weak points in the gaps between the cells 102, allowing the battery pack 100 to be designed as an integral structural member of great rigidity. On the other hand, the two first reinforcing plates 104 and the cell array 101 arranged between the two first reinforcing plates 104 form a honeycomb-like structure. From a mechanical point of view, the honeycomb-like structure can bear the maximum force with the least material. When the cell array 101 is subjected to a load perpendicular to the first reinforcing plate 104, the first reinforcing plate 104 and the cell array 101 deform in coordination. Therefore, the rigidity and strength of the battery pack 100 are greatly enhanced, thereby improving the mechanical safety and reliability.

Figure 14:
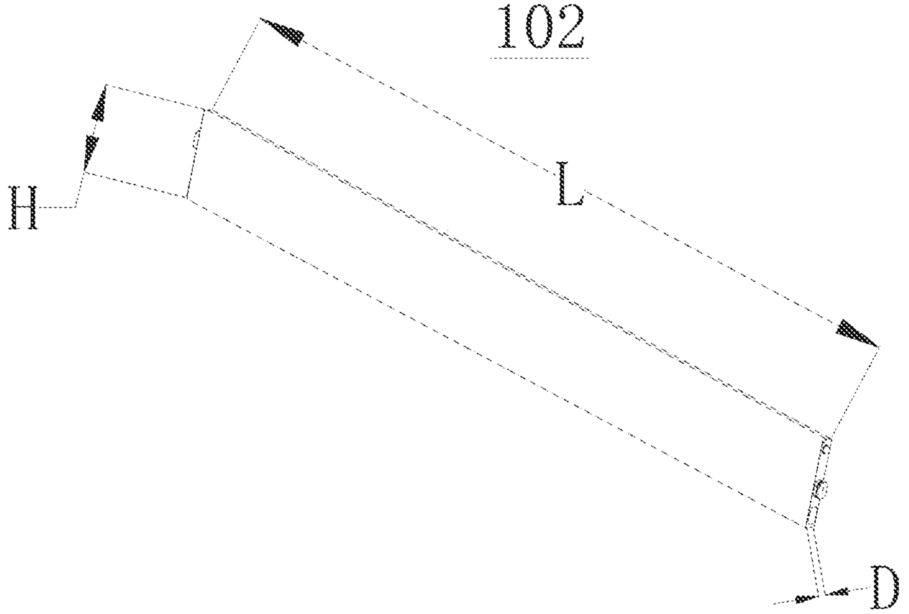
FIG. 14 is a schematic structural diagram of a cell according to the present disclosure.

In the present disclosure, as shown in FIG. 14, the cell 102 is a prismatic cell of a cuboid structure, including two first surfaces opposite to each other in a thickness direction, two second surfaces opposite to each other in a height direction, and two third surfaces opposite to each other in a length direction. The area of the first surface is larger than the area of the second surface, and the area of the first surface is larger than the area of the third surface.

The cells 102 are arranged along the thickness direction, and the cells 102 are fixedly adhered to each other by a structural adhesive, i.e. the first surfaces of the cells 102 are adhered to each other. In other words, the cells 102 are arranged and adhered with large surfaces thereof facing toward each other, thereby increasing the area of adhesion between the cells 102, and enhancing the adhesion between the cells 102.

In the arrangement direction of the cells 102, the cells 102 are likely to displace relative to each other. Therefore, by the two first reinforcing plates 104 are adhered to the two surfaces of the cell array 101 opposite to each other along the arrangement direction of the cells 102, the relative positions between the cells 102 can be constrained.

In the present disclosure, the two first reinforcing plates 104 may be adhered to the two second surfaces of the cells 102, or may be adhered to the two third surfaces of the cells 102.

In the present disclosure, because the length of the cell 102 is greater than the height of the cell 102 and the height of the cell 102 is greater than the thickness of the cell 102, an area of the second surface defined by the length and the thickness is greater than an area of the third surface defined by the height and the thickness. To enhance the adhesion, the two first reinforcing plates 104 are adhered to the second surfaces of the cells 102.

In the present disclosure, the two surfaces of all the cells 102 along the arrangement direction may be adhered to the first reinforcing plates 104, or, the two surfaces of only some of the cells 102 along the arrangement direction may be directly adhered to the first reinforcing plates 104.

That is, in the present disclosure, the two second surfaces or the two third surfaces of some of the cells may be adhered to the first reinforcing plates 104, and the two second surfaces or the two third surfaces of some of the cells 102 may not be adhered to the first reinforcing plates 104.

In order to improve the adhesion strength, the number of cells 102 directly adhered to the two first reinforcing plates 104 is not less than half of the number of cells contained in the cell array 101.

For at least one cell 102 in the cell array 101, the two second surfaces or the two third surfaces of the cell 102 may both be adhered to the two first reinforcing plates 104, or, one of the two second surfaces or the two third surfaces of the cell 102 is adhered to the first reinforcing plate 104, and the other is not adhered to the first reinforcing plate 104.

In the present disclosure, the two second surfaces or the two third surfaces of the cell 102 are entirely adhered to the first reinforcing plate 104, or the two second surfaces or the two third surfaces of some of the cells 102 are partially adhered to the first reinforcing plate 104.

In order to enhance the strength of the entire battery pack 100, in the present disclosure, the two second surfaces or the two third surfaces of all the cells 102 in the cell array 101 are adhered to the two first reinforcing plates 104, to maximize the strength and rigidity of the battery pack 100.

In the present disclosure, the shapes and areas of the two first reinforcing plates 104 are not particularly limited, as long as the two first reinforcing plates 104 have a certain strength, can connect the cell array 101 to form a unity, can enhance the structural strength of the cell array 101, and are not readily deformable.

In some embodiments, the shape of the first reinforcing plate 104 and the shape of the surface of the cell array 101 to which the first reinforcing plate 104 is adhered are the same and are set corresponding to each other, so that the first reinforcing plate 104 can be more easily tightly adhered to the surface of the cell array 101.

In some embodiments, an area of the first reinforcing plate 104 may be different from an area of the surface of the cell array 101 to which the first reinforcing plate 104 is adhered. When the strength of the battery pack 100 meets requirements and the first reinforcing plate 104 can connect the cell array 101 to form a unity, the area of the first reinforcing plate 104 may be smaller than the area of the surface of the cell array 101 to which the first reinforcing plate 104 is adhered.

In some implementations, at least one of the first reinforcing plates 104 is a "¬"-shaped plate, where the "—"-shaped part of the "¬"-shaped plate is arranged in contact with the second surface of the cell 102 in the cell array 101, and the "|"-shaped part of the "¬"-shaped plate is arranged in contact with the third surface of the cell 102 in the cell array 101. Or the "—"-shaped part of the "¬"-shaped plate is arranged in contact with the third surface of the cell 102 in the cell array 101, and the "|"-shaped part of the "¬"-shaped plate is arranged in contact with the second surface of the cell 102 in the cell array 101.

In some implementations, at least one of the first reinforcing plates 104 is a "⊔"-shaped plate, where the "—"-shaped part of the "⊔"-shaped plate is arranged in contact with the second surface of the cell 102 in the cell array 101, and the two "|"-shaped parts of the "⊔"-shaped plate are arranged in contact with the third surface of the cell 102 in the cell array 101. Or the "—"-shaped part of the "⊔"-shaped plate is arranged in contact with the third surface of the cell 102 in the cell array 101, and the two "|"-shaped parts of the "⊔"-shaped plate are arranged in contact with the second surface of the cell 102 in the cell array 101.

By arranging a bent portion or bent portions bent toward a side surface of the cell array 101 on an edge of the first reinforcing plate 104, the strength and structural stability of the entire cell array 101 can be enhanced.

In the present disclosure, the first reinforcing plates 104 and the cells 102 in the cell array 101 constitute a honeycomb-like structure, and the first reinforcing plates 104 and the cells 102 in the cell array 101 deform in coordination. A deformation of the first reinforcing plate 104 causes the cell 102 to deform at the same time, which is equivalent to providing an additional bending moment to the first surface of the cell 102, resulting in a reduced strength of the honeycomb-like structure. As the thickness of the first reinforcing plate 104 increases, the strength of the honeycomb-like structure increases. However, the increase in the strength of the honeycomb-like structure by increasing the thickness of the first reinforcing plate 104 cannot exceed a maximum value. This is because the increase in the thickness of the first reinforcing plate 104 leads to an increase in the bending rigidity of the first reinforcing plate 104, and when the thickness of the first reinforcing plate 104 increases to a certain extent, the strength of the honeycomb-like structure relies on the strength of the cell array 101. Consequently, when an ultimate bearing capacity is reached due to the instability and collapse of the first reinforcing plate 104, the entire honeycomb-like structure loses its bearing capacity. It is found through multiple experiments that when the thickness of the first reinforcing plate 104 is 0.5-5 mm, the first reinforcing plate 104 within this thickness range can provide an optimal reinforcing effect for the honeycomb-like structure, so as to meet the strength requirements of the battery pack 100. In some implementations, the thickness of the first reinforcing plate 104 is 1-3 mm.

In the present disclosure, the first reinforcing plates 104 may be made of a metal material.

The first reinforcing plates 104 made of the metal material not only protect the cells 102 inside the battery pack, but also provide a heat dissipation effect. The first reinforcing plates 104 may be made of a metal material with high thermal conductivity, including but not limited to aluminum, copper, and alloys thereof.

In practice, the first reinforcing plates 104 may be made of an aluminum alloy material, which has a good heat-conducting property and low density.

Figure 6:
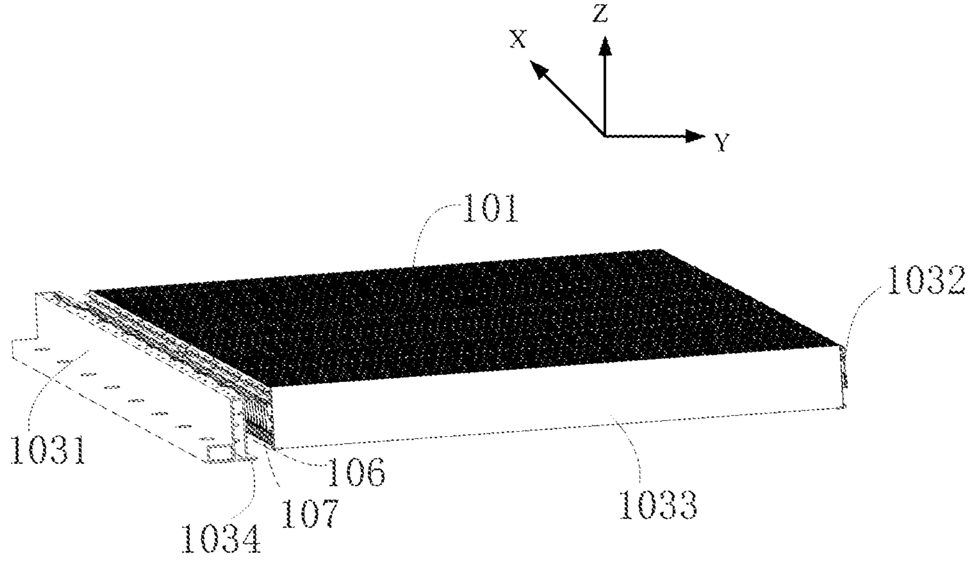
FIG. 6 is a schematic structural diagram of a cell array fitted to a side frame of a tray according to the present disclosure.

As shown in FIG. 1, FIG. 6, and FIG. 14, the length direction of the cell 102 is defined as a Y direction, the height direction thereof is defined as a Z direction, and the thickness direction is defined as an X direction.

The cell 102 is substantially of a cuboid structure. To be specific, the cell 102 may be cuboid or cubic, or may be partially special-shaped but basically cuboid or cubic, or may be largely of a cuboid or cubic shape having a notch, a bump, a chamfer, an arc portion, or a bent portion.

In some implementations, the cell 102 satisfies: 600 mm≤L≤2500 mm, and 10≤L/D≤208.

The cell 102 has a long length and a small thickness, so the cell 102 can be regarded as a rigid member with great strength, which well functions as a reinforcing beam in the casing and reduces the use of reinforcing ribs in the casing, in this way, not only the weight of the battery pack 100 can be reduced, but also the structure of the casing can be greatly simplified, thereby improving the utilization of the space inside the battery pack 100 and the energy density of the battery pack 100.

In some embodiments, in the height direction (i.e., the Z direction) of the cell 102, a number of layers of cell arrays 101 are arranged. A partition plate is arranged between two neighboring layers of cell arrays 101, and the partition plate is fixedly adhered to the cell arrays 101 on two sides of the partition plate.

In this implementation, with the arrangement of the partition plate between the two layers of cell arrays 101, each layer of cell array 101 and the partition plates or panels on upper and lower surfaces of the cell array 101 form a number of I-beam structures, to form a honeycomb-like structure. Therefore, the rigidity and strength of the battery pack 100 are greatly enhanced, thereby improving the mechanical safety and reliability.

Figure 13:
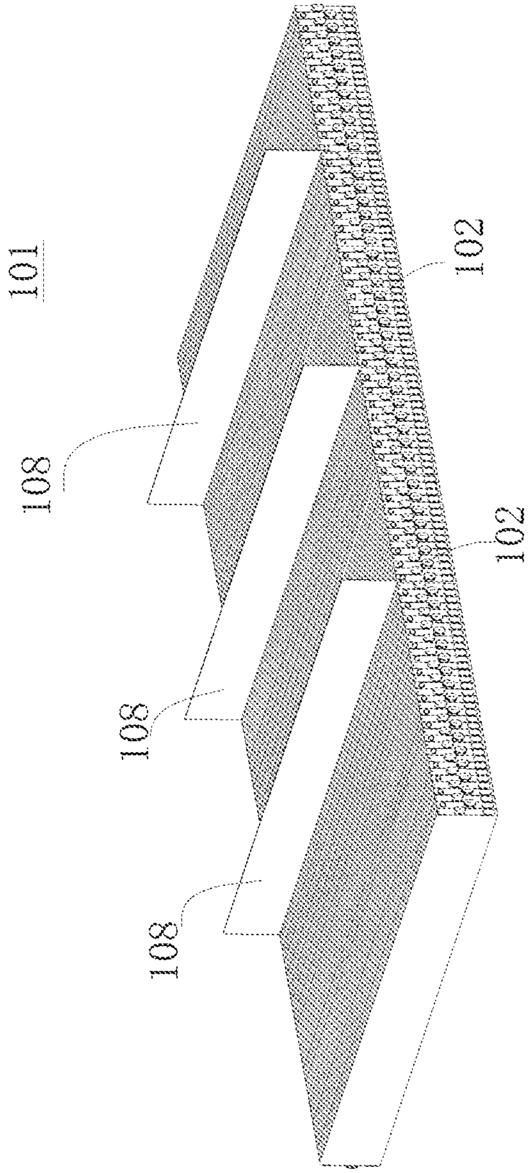
FIG. 13 is a schematic structural diagram showing arrangement of second reinforcing plates in a cell array according to the present disclosure.

In some implementations, as shown in FIG. 13, in order to further enhance the overall strength of the battery pack 100, a second reinforcing plate 108 is arranged between at least two neighboring cells 102. The arrangement of the second reinforcing plate 108 can well absorb the impact received by the cell array 101 in three-dimensional directions, thereby enhancing the mechanical strength of the entire cell array 101.

In the present disclosure, the second reinforcing plate 108 may be an aluminum or steel plate. The number of the second reinforcing plates 108 is not limited, and may be one or more. When the number of the second reinforcing plates 108 is more than one, the second reinforcing plate 108 may be arranged between every two neighboring cells 102, or the second reinforcing plate 108 may be arranged between only some of the neighboring cells 102.

In order to facilitate the dense arrangement of the cells 102 in the entire battery pack 100, in some implementations, the second reinforcing plate 108 may be of a shape which is substantially similar to the shape of the cell 102, i.e., may be fabricated into a "dummy cell". The term "dummy cell" means that from the appearance, the dummy cell looks exactly the same as the cell 102, but the dummy cell does not contain an electrode assembly including a positive electrode, a negative electrode, and separator, and provides a reinforcing function only.

The second reinforcing plate 108 is fixedly adhered to the cells 102 arranged on two sides of the second reinforcing plate 108, to enhance the strength of the entire battery pack 100.

Figure 5:
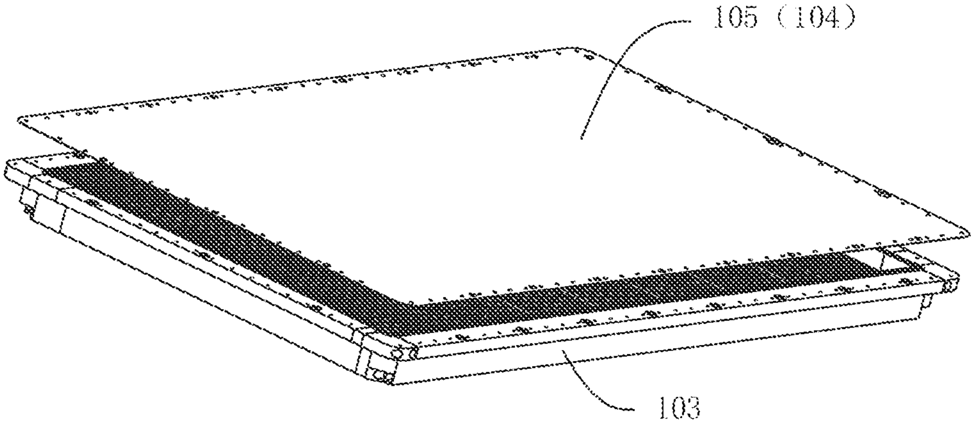
FIG. 5 is a schematic structural diagram showing adhesion of a cell array to a tray and an upper cover according to the present disclosure.

In some implementations, as shown in FIG. 5, the battery pack 100 further includes an upper cover 105 and a tray 103. The tray 103 includes a bottom plate 1035 and a side frame surrounding the bottom plate 1035. The upper cover 105 and the tray 103 are connected to define a cell accommodating chamber, and the cell array 101 is arranged in the cell accommodating chamber.

In some implementations, the two first reinforcing plates 104 constitute the upper cover 105 and the bottom plate 1035 respectively.

In other words, two surfaces of the cell array 101 are respectively adhered to the upper cover 105 and the bottom plate 1035.

In this implementation, the surface of the cell array 101 facing the upper cover 105 is adhered to the upper cover 105, and the surface of the cell array 101 facing the bottom plate 1035 is adhered to the bottom plate 1035. In this way, the two surfaces of the cell array 101 opposite to each other are both adhered to the casing of the battery pack 100, and the cells 102 are adhered to each other, which improves the integrity of the battery pack 100, and reduces gaps between fasteners and cells, gaps between cells, and gaps between fasteners. Therefore, weak points in the battery pack 100 are reduced, thereby improving the strength and rigidity of the entire battery pack 100.

Figure 11:
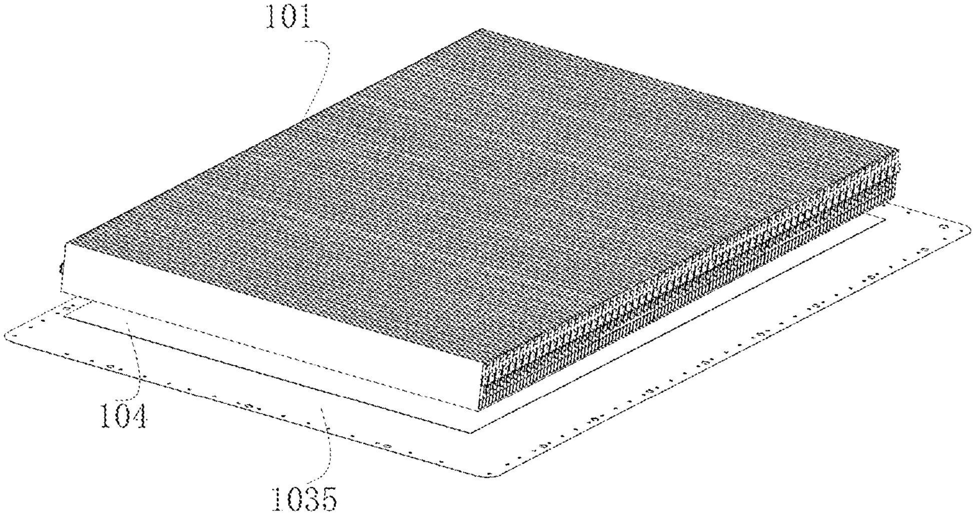
FIG. 11 is a schematic structural diagram showing adhesion of a first reinforcing plate to a bottom plate of a tray according to the present disclosure.

In some implementations, one of the first reinforcing plates 104 is adhered to an inner surface of the upper cover 105 (not shown in the figure), and the other first reinforcing plate 104 is adhered to an inner surface of the bottom plate 1035 (as shown in FIG. 11). In this way, the cell array 101 is indirectly adhered to the casing of the battery pack 100, which facilitates assembly and processing.

In some implementations, the upper cover 105 and/or the tray 103 may be of a multi-layer composite structure, to enable the battery pack 100 to well bear the impact to the entire vehicle, thereby improving the structural strength.

In this implementation, the bottom plate 1035 of the battery pack 100 may be designed as a sandwich composite material structure, which can bear the structural strength of the entire battery module. The bottom plate 1035 is designed as a composite board structure, and integrates a support strength function and a stone-chip resistant function for the bottom of the battery. The bottom plate 1035 may also integrate a support strength function and a liquid cooling function for the bottom of the battery.

For example, in some implementations, the multi-layer composite structure includes two layers of aluminum plates and a steel plate or a foamed aluminum plate sandwiched between the two layers of aluminum plates, i.e., the multi-layer composite structure is aluminum plate/foamed aluminum plate/aluminum plate or the multi-layer composite structure is aluminum plate/steel plate/aluminum plate.

In some other implementations, the multi-layer composite structure includes two fiber composite layers and a foamed material layer sandwiched between the two fiber composite layers.

The foamed material layer includes a foamed polymer material, e.g., a polyurethane foam or phenolic foam material. The foamed material layer has a low thermal conductivity and can provide a good thermal insulation effect. In addition, the foamed material is of low density, and can reduce the weight of the battery pack 100 as compared with the case where the sealing cover is made of a steel plate or aluminum alloy.

The fiber composite layer includes a glass fiber layer and/or a carbon fiber layer. In other words, the multi-layer composite layer may be glass fiber layer/foamed material layer/glass fiber layer, carbon fiber layer/foamed material layer/carbon fiber layer, or glass fiber layer/foamed material layer/carbon fiber layer. By designing the upper cover 105 and/or the tray 103 of the battery pack 100 as a foamed material layer and fiber composite layers distributed on inner and outer sides of the foamed material layer, the fiber layers are of a high tensile strength and elastic modulus, are deformation-resistant when the internal pressure of the battery pack 100 increases within a certain range, and can also effectively insulate fire and heat, thereby improving the safety performance of the battery pack 100 under extreme conditions.

The structural strength of the integral battery pack 100 may provide part of the structural strength of the vehicle. The battery pack 100 can be used to enhance the structural strength of the vehicle, such a design allows for the simplification of the structure designed for the frame of the vehicle to protect the structural strength of the battery pack 100, and meets the requirements for a lightweight design of the vehicle, thereby reducing the manufacturing costs and improving the efficiency of vehicle production.

Figure 12:
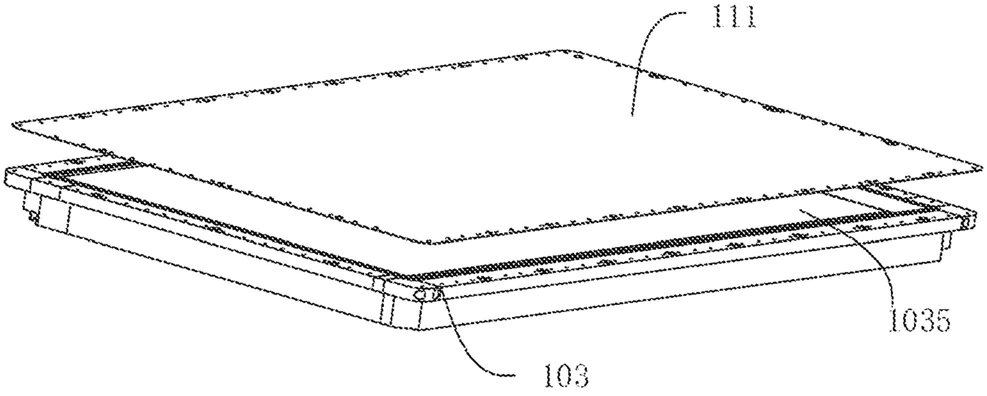
FIG. 12 is a schematic structural diagram showing arrangement of a protection plate on an outer surface of a bottom plate according to the present disclosure.

In some implementations of the present disclosure, as shown in FIG. 12, for example, in the implementation where the two first reinforcing plates 104 constitute the upper cover 105 and the bottom plate 1035 respectively, the bottom plate 1035 of the tray 103 is a single-layer aluminum plate, a protection plate 111 is arranged on an outer surface of the bottom plate 1035 of the tray 103, and the protection plate 111 is a multi-layer composite structure. The protection plate 111 can effectively protect the bottom of the power battery pack 100 to prevent the power battery pack 100 from being directly damaged by stone chips or bumping, meets the ball impact requirements on the bottom by a lightweight design, and has good safety and reliability. In addition, the composite material of the protection plate 111 at the bottom has environmental reliability such as corrosion resistance and aging resistance. The design of the bottom plate 1035 as a detachable compact structure with strong protection facilitates after-sales maintenance in the future, and greatly reduces after-sale maintenance costs.

For the multi-layer composite structure of the protection plate 111, reference may be made to the above descriptions, so the details will not be repeated herein.

Various connection and fixing methods may be designed for the protection plate 111 and the side frame of the tray 103 of the battery pack 100, including riveting, automatic punch riveting, bolted connection, etc., which can be disassembled freely and facilitates repair, maintenance and inspection.

Figure 7:
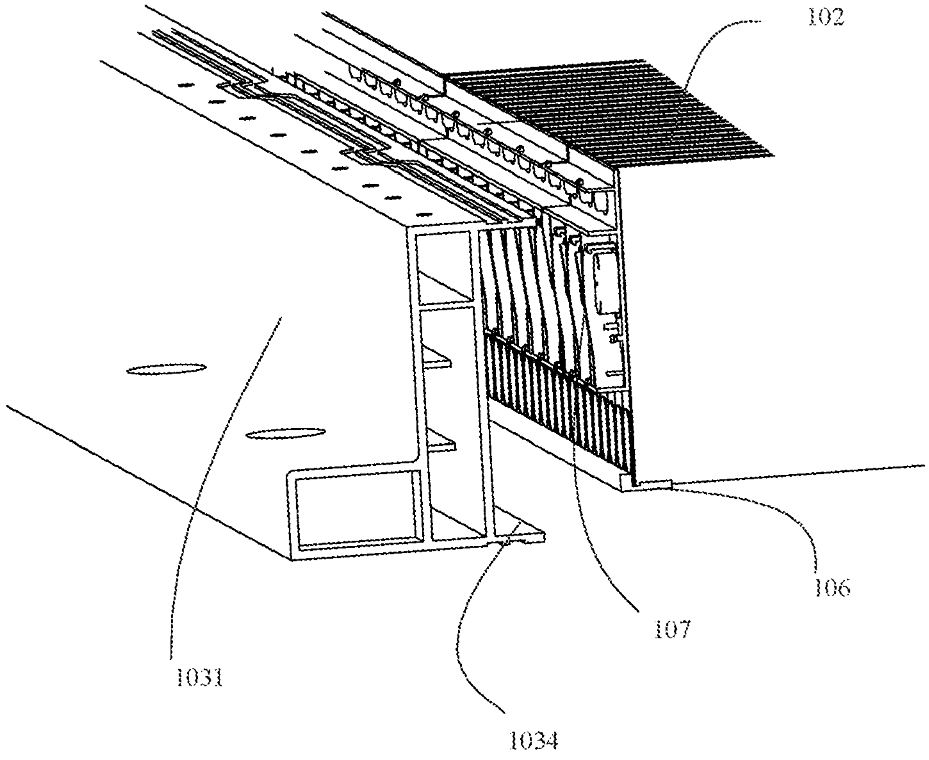
FIG. 7 is a partially enlarged view of FIG. 6.
Figure 8:
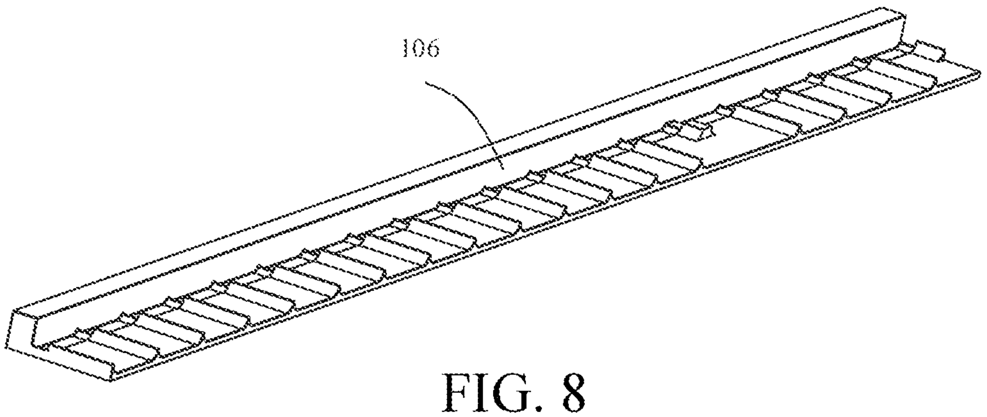
FIG. 8 is a schematic structural diagram of a first supporting structure according to the present disclosure.
Figure 9:
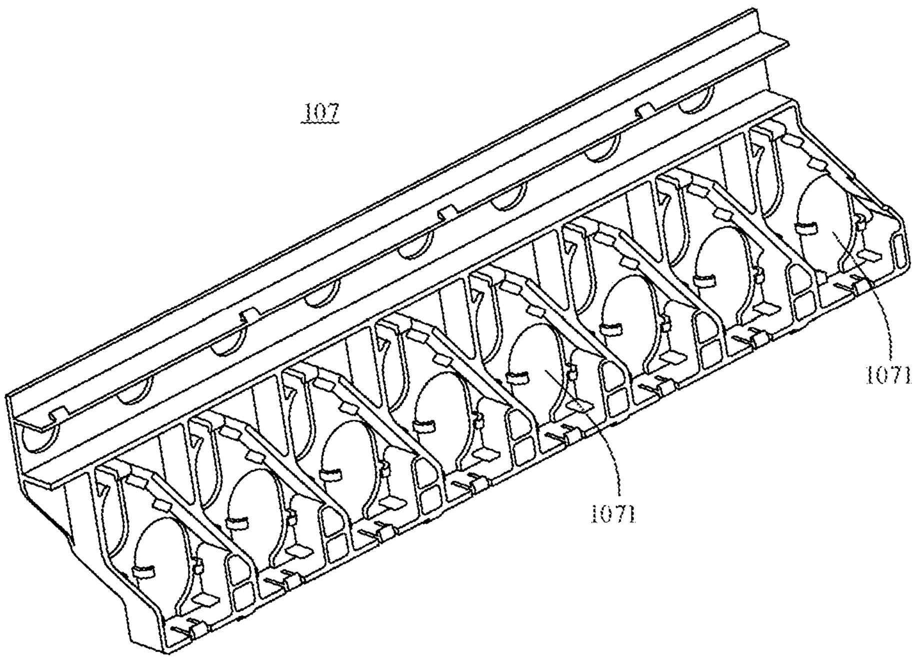
FIG. 9 is a schematic structural diagram of a second supporting structure according to the present disclosure.

As shown in FIG. 6 and FIG. 7, the upper cover 105 is provided with a sealing groove at a position corresponding to the side frame, a sealant layer is arranged in the sealing groove, and the upper cover 105 and the tray 103 are hermetically connected by the sealant. layer.

In some implementations, the sealing groove may be provided on only the upper cover 105 or on only the side frame, or the upper cover 105 and the side frame are each provided with the sealing groove.

In some implementations, the upper cover 105 may also be hermetically fixed to the side frame by riveting or bolts, so as to improve the sealing performance and the structural strength of the entire battery pack 100.

At the position for sealed fitting between the side frame of the battery and the upper cover 105, a sealing groove is designed for sealing. The sealing groove may be designed on the side frame of the battery or on the upper cover 105, to ensure the sealing and fixing between the side frame and the upper cover 105.

A structural adhesive is filled between the cell array 101 and an inner surface of the side frame. A gap between the cell array 101 and the side frame often becomes a weak point, and by injecting the structural adhesive to adhere the cell 102 to the side frame, the strength is enhanced.

As shown in FIG. 6 and FIG. 7, in some embodiments, each of the cells 102 is substantially of a cuboid structure, including a first end and a second end arranged opposite to each other along the length direction. The side frame includes a first side frame 1031 and a second side frame 1032 arranged opposite to each other along the length direction of each of the cells 102. The cells 102 are disposed between the first side frame 1031 and the second side frame 1032. The first end of each of the cells 102 is supported by the first side frame 1031, and the second end of each of the cells 102 is supported by the second side frame 1032. In other words, the cells 102 extend between the first side frame 1031 and the second side frame 1032.

Because the cells 102 extend between the first side frame 1031 and the second side frame 1032, and the two ends of the cell 102 are respectively supported by the first side frame 1031 and the second side frame 1032, the cell 102 itself can serve as a transverse beam or longitudinal beam to enhance the structural strength of the casing. That is, no reinforcing structure for enhancing the structural strength needs to be arranged in the casing, and the cell 102 itself can be directly used to replace the reinforcing structure to ensure the structural strength of the casing, thereby ensuring that the casing does not easily deform under an external force.

In some embodiments of the present disclosure, a first support step 1034 is arranged on the first side frame 1031, a second support step is arranged on the second side frame 1032, the first end of each of the cells 102 is supported by the first support step 1034, and the second end of each of the cells 102 is supported by the second support step.

In some embodiments of the present disclosure, the first end of each of the cells 102 may be directly or indirectly supported by the first side frame 1031, and the second end of each of the cells 102 may be directly or indirectly supported by the second side frame 1032. The term "directly" means that the first end of the cell 102 is in direct contact fit with and supported by the first side frame 1031, and the second end of each of the cells 102 is in direct contact fit with and supported by the second side frame 1032.

As shown in FIG. 6 and FIG. 7, the battery pack 100 further includes a supporting structure. The first end of each of the cells 102 is fitted to and supported by the first side frame 1031 through the supporting structure, and the second end of the cell 102 is fitted to and supported by the second side frame 1032 through the supporting structure.

In this implementation, the term "fit" means that a spacing between the two side frames is configured for mounting one cell 102. The fit may be various fitting methods such as clearance fit, interference fit, tight fit, immovable fit, etc., thereby achieving the objective of the present disclosure.

The arrangement of the supporting structure between the two ends of the cell 102 in the length direction and the side frame can enhance the strength of the cell array 101 and the strength of the battery frame.

With the arrangement of the supporting structure, when the side frame receives an external force, the cell 102 itself is a rigid member with great strength, and can transmit a force to the side frame through the supporting structure, to prevent plastic deformation of the side frame.

Figure 15:
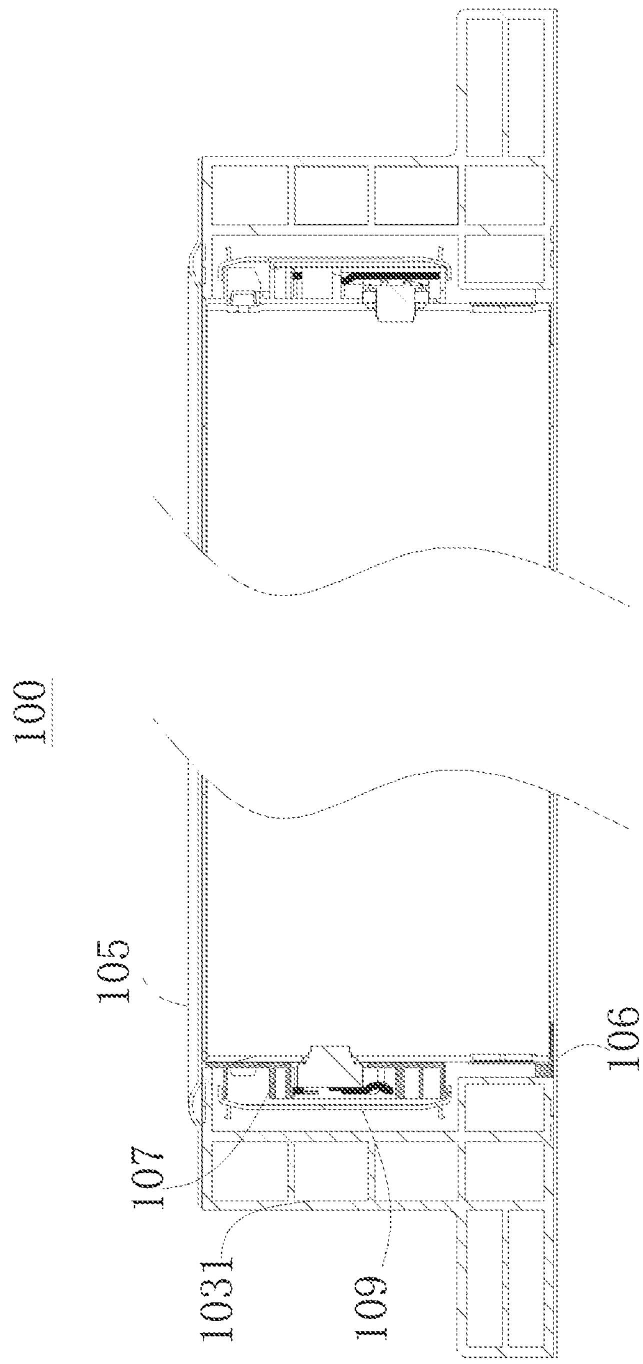
FIG. 15 is a cross-sectional view of a battery pack according to the present disclosure.

In some implementations, as shown in FIG. 6, FIG. 7, and FIG. 15, the supporting structure includes a first support block 106, a lower surface of the first end of each of the cells 102 is supported by the first side frame 1031 through the first support block 106, and/or a lower surface of the second end of the cell 102 is supported by the second side frame 1032 through the first support block 106.

The first support block 106 is fixedly mounted on lower surfaces of the ends of the cell 102 in the length direction, which on the one hand facilitates the positioning of the cells 102 when the cells are arranged to form the cell array 101, and on the other hand insulates and isolates the cells 102 from the bottom plate 1035 of the tray 103. In addition, the side frame can be connected to a lower end surface of the cell 102 by the first support block 106, thereby improving the strength and rigidity of the entire battery pack 100.

Through the first support block 106, the lower surface of the first end of each of the cells 102 may be supported by the first side frame 1031, or may be supported by the support step on the first side frame 1031. Through the first support block 106, the lower surface of the second end of the cell 102 may be supported by the second side frame 1032 through the first support block 106, or may be supported by the support step on the second side frame 1032.

In some implementations of the present disclosure, the supporting structure includes a second support block 107, the first end of each of the cells 102 facing the first side frame 1031 is fitted to the first side frame 1031 through the second support block 107, and/or, the second end of each of the cells 102 facing the second side frame 1032 is fitted to the second side frame 1032 through the second support block 107.

Each of the cells 102 includes electrode terminals. The electrode terminals are respectively arranged at the first end and the second end of each of the cells 102. Holes 1071 are provided on the supporting structure. The electrode terminals of each of the cells 102 extend through the holes 1071 respectively and are electrically connected by a cell connector 110.

Figure 10:
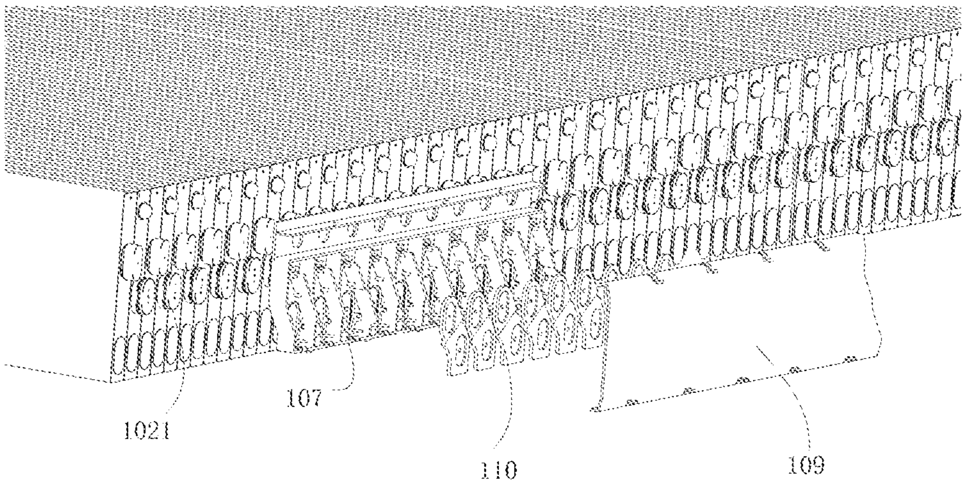
FIG. 10 is an exploded view of a second supporting structure, a cell connector and, and an insulation according to the present disclosure.

In a first implementation of the present disclosure, as shown in FIG. 10 and FIG. 14, the battery pack 100 further includes an insulation partition plate 109, and the insulation partition plate 109 is arranged between the supporting structure and an inner surface of the side frame. The insulating partition plate is configured to insulate the cell connector 110 and the electrode terminals from the side frame, to prevent a short circuit and other safety problems.

As shown in FIG. 7 and FIG. 15, a second supporting structure is mounted on a side surface of the electrode terminals, to fix the cell connector 110 of each of the cells 102 and a flexible printed circuit board (FPC).

The electrode terminals of each of the cells 102 are also weak points, and the second support block 107 can protect the electrode terminals.

In the present disclosure, the specific structure of the supporting structure is not limited, as long as the supporting structure is of a certain strength and is resistant to deformation under an external force. In some implementations, the material of the supporting structure includes one or more of polyether plastic (PPS), glass fiber, or polycarbonate.

In some embodiments of the present disclosure, the side frame includes a third side frame 1033 and a fourth side frame arranged opposite to each other along the arrangement direction of the cells 102. The number of cells 102 are arranged side by side between the third side frame 1033 and the fourth side frame. The third side frame 1033 and the fourth side frame are respectively fixedly adhered to each of the cells 102 adjacent thereto.

The arrangement of the third side frame 1033 and the fourth side frame makes the cell array 101 and the side frame to form a unity, and the side frame of the battery tightly clamps the cell array 101 along the arrangement direction of the cells 102.

That is, the third side frame 1033 applies an acting force, which is toward the fourth side frame, on the cell 102 arranged adjacent to the third side frame 1033, and the fourth side frame applies an acting force, which is toward the third side frame 1033, on the cell 102 arranged adjacent to the fourth side frame, so that the number of cells 102 can be closely arranged between the third side frame 1033 and the fourth side frame, and the number of cells 102 can closely fit each other. Moreover, the third side frame 1033 and the fourth side frame may provide a limiting function for the cells 102, and especially when the cell 102 undergoes slight expansion, may provide a buffering function and an inward pressure for the cell 102, to prevent the cell 102 from excessive expansion and deformation.

In order to further solve the expansion problem of the cell array 101, a reinforcing beam is arranged on the third side frame 1033 and/or the fourth side frame. The reinforcing beam may be in close contact with to the outer surface of each of the cells adjacent thereto or may be spaced from each of the cells adjacent thereto by a gap, to provide a limiting function for the expansion of the cell array 101.

The side frame and the bottom plate 1035 of the tray 103 may be adhered to each other by a structural adhesive, may be directly welded together, or may be connected by bolts. The side frame may be an integral frame or a split-type frame. In some embodiments of the present disclosure, the side frame is a split-type frame, i.e. the first side frame 1031, the second side frame 1032, the third side frame 1033, and the fourth side frame are separate from each other. The connection between the two side frames may be further reinforced by a fastener.

An assembly process of the battery pack 100 is described below using an example where each of the cells 102 is a cuboid cell, the electrode terminals of each of the cells 102 are arranged on the two ends of the cell 102 along the length direction, the first side frame 1031, the second side frame 1032, the third side frame 1033, and the fourth side frame are separate from each other, and the two first reinforcing plates 104 constitute the upper cover 105 and the bottom plate 1035 of the battery pack respectively.

Step 1: The number of cells 102 are arranged along the thickness direction to form the cell array, with the cells 102 being aligned to each other in the height direction and the length direction. The cells 102 are adhered to each other by a structural adhesive 1011. The arrangement direction of the cells 102 is defined as an X direction. The length direction of the cell 102 is defined as a Y direction.

Step 2: Along the X direction, two first surfaces with the largest areas of the two outermost cells 102 in the cell array 101 opposite to each other are respectively adhered to the third side frame 1033 and the fourth side frame (where this direction is not a lead-out direction of the electrode terminals).

Step 3: Along the Y direction, the first side frame 1031 and the second side frame 1032 are arranged on the two end faces of the cell array 101.

Step 4: The first side frame 1031 and the second side frame 1032 are connected to the third side frame 1033 and the fourth side frame by welding or fasteners (bolts, etc.).

Step 4: The two first reinforcing plates 104 are adhered to the two surfaces of the cell array 101 opposite to each other along the arrangement direction of the cells 102.

Step 5: The first reinforcing plates 104 are connected to the first side frame 1031, the second side frame 1032, the third side frame 1033, and the fourth side frame by a structural adhesive or fasteners. One of the first reinforcing plates 104 is the upper cover 105 of the battery pack 100. The other first reinforcing plate 104 is the bottom plate 1035 of the battery pack 100.

Step 6: The protection plate 111 is further arranged on the outer surface of the bottom plate 1035.

Step 7: A structural adhesive is filled in or a supporting structure is arranged at the gap between the cell array 101 and the side frame.

As can be seen from the above assembly process, the six surfaces of the cell 102 are all of a strong structural strength, and the design of the battery pack 100 as an integral structure greatly enhances the rigidity and strength, thereby greatly improving the mechanical safety and reliability. The structural strength of the integral battery pack 100 may provide part of the structural strength of the vehicle. The battery pack 100 can be used to enhance the structural strength of the vehicle, such a design allows for the simplification of the structure designed for the frame of the vehicle to protect the structural strength of the battery pack 100, and meets the requirements for a lightweight design of the vehicle, thereby reducing the manufacturing costs and improving the efficiency of vehicle production.

In the present disclosure, the battery pack 100 further includes a battery management system.

According to a second aspect of the present disclosure, an electric vehicle is provided and includes the above battery pack 100. The electric vehicle has a long battery life and requires low costs.

In the description of the present disclosure, it should be noted that unless otherwise explicitly specified or defined, the terms such as “mount”, “install”, “connect”, and “connection” should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

In description of this specification, description of reference terms such as “an embodiment”, “specific embodiments”, or “an example”, means including specific features, structures, materials, or features described in the embodiment or example in at least one embodiment or example of the present disclosure. In this specification, schematic descriptions of the foregoing terms do not necessarily point at a same embodiment or example. In addition, the described specific features, structures, materials, or characteristics may be combined in a proper manner in any one or more of the embodiments or examples.

Although the embodiments of the present disclosure have been shown and described, a person of ordinary skill in the art is to be understand that various changes, modifications, replacements, and variations may be made to the embodiments without departing from the principles and spirit of the present disclosure, and the scope of the present disclosure is as defined by the appended claims and their equivalents.

What is claimed is:

1. A battery pack, comprising: a plurality of layers of cell arrays arranged along a height direction of cells, a partition plate is arranged between two neighboring layers of cell arrays, and the partition plate is fixedly adhered to the cell arrays on two sides of the partition plate, each of the layers of cell arrays comprising at least a cell array, wherein the cell array comprises a plurality of cells, each of the cells is defined with a length L, a thickness D, and a height H between the length L and the thickness D, the cells are arranged along an arrangement direction of the cells, and entire first surfaces of the cells are adhered to each other by a structural adhesive;

a tray comprising a bottom plate and a side frame;

a supporting structure disposed between the cell array and the side frame, wherein the supporting structure is a component that is separated and distinct from the tray, is in direct contact with the cell array, and directly supports the cell array against the side frame;

two first reinforcing plates, wherein the two first reinforcing plates are arranged opposite to each other and are respectively adhered to two surfaces of the cell array along the arrangement direction, and are configured to constrain relative positions between the cells; and a second reinforcing plate arranged between at least two neighboring cells, wherein the second reinforcing plate is adhered to two cells arranged on two sides of the second reinforcing plate along the arrangement direction.

2. The battery pack according to claim 1, wherein the two first reinforcing plates are respectively adhered to two opposite surfaces of the cells along the height direction of the cells.

3. The battery pack according to claim 1, wherein at least one of the cells satisfies: 600 mm≤L≤2500 mm, and 10≤L/D≤208.

4. The battery pack according to claim 1, wherein the arrangement direction of the cells is a thickness direction of the cells.

5. The battery pack according to claim 1, wherein the battery pack further comprises an upper cover, the side frame surrounds the bottom plate, the upper cover and the tray are connected to define a cell accommodating chamber, and the cell array is arranged in the cell accommodating chamber.

6. The battery pack according to claim 5, wherein the two first reinforcing plates constitute the upper cover and the bottom plate respectively, and the battery pack further comprises a protection plate arranged on an outer surface of the bottom plate.

7. The battery pack according to claim 6, wherein the protection plate comprises two layers of aluminum plates and a steel plate or a foamed aluminum plate sandwiched between the two layers of aluminum plates;

or the protection plate comprises two fiber composite layers and a foamed polymer layer sandwiched between the two fiber composite layers, and the fiber composite layer comprises a glass fiber layer or a carbon fiber layer.

8. The battery pack according to claim 5, wherein outer surfaces of the two first reinforcing plates are respectively adhered to an inner surface of the upper cover and an inner surface of the bottom plate.

9. The battery pack according to claim 5, wherein at least one of the bottom plate or the upper cover comprises two layers of aluminum plates and a steel plate or a foamed aluminum plate sandwiched between the two layers of aluminum plates;

or at least one of the bottom plate and the upper cover comprises two fiber composite layers and a foamed polymer layer sandwiched between the two fiber composite layers, and the fiber composite layer comprises a glass fiber layer or a carbon fiber layer.

10. The battery pack according to claim 5, wherein the upper cover is provided with a sealing groove at a position corresponding to the side frame, a sealant layer is arranged in the sealing groove, and the upper cover and the tray are hermetically connected by the sealant layer.

11. The battery pack according to claim 5, wherein a gap between the cell array and the side frame is filled with a structural adhesive.

12. The battery pack according to claim 5, wherein each of the cells comprises a first end and a second end arranged opposite to each other along a length direction, the side frame comprises a first side frame and a second side frame arranged opposite to each other along the length direction of each of the cells, the first end of each of the cells is supported by the first side frame, and the second end of each of the cells is supported by the second side frame.

13. The battery pack according to claim 12, wherein a first support step is arranged on the first side frame, a second support step is arranged on the second side frame, the first end of each of the cells is supported by the first support step, and the second end of each of the cells is supported by the second support step.

14. The battery pack according to claim 13, wherein the first end of each of the cells is fitted to and supported by the first side frame through the supporting structure, and/or the second end of the cell is fitted to and supported by the second side frame through the supporting structure.

15. The battery pack according to claim 14, wherein the supporting structure comprises a first support block, a lower surface of the first end of each of the cells is supported by the first side frame through the first support block, and/or a lower surface of the second end of each of the cells is supported by the second side frame through the first support block.

16. The battery pack according to claim 14, wherein the supporting structure comprises a second support block, the first end of each of the cells facing the first side frame is fitted to the first side frame through the second support block, and/or the second end of each of the cells facing the second side frame is fitted to the second side frame through the second support block.

17. The battery pack according to claim 14, wherein each of the cells comprises electrode terminals, the electrode terminals are respectively arranged at the first end and the second end of each of the cells, holes are provided on the supporting structure, and the electrode terminals of each of the cells extend through the holes respectively and are electrically connected by a cell connector, and the battery pack further comprises an insulation partition plate arranged between the supporting structure and an inner surface of the side frame.

18. The battery pack according to claim 5, wherein the battery pack further comprises a third side frame and a fourth side frame arranged opposite to each other along the arrangement direction of the cells, and the third side frame and the fourth side frame are respectively fixedly adhered to each of the cells adjacent thereto.

19. The battery pack according to claim 18, wherein a reinforcing beam is arranged on the third side frame and/or the fourth side frame, and the reinforcing beam is configured to limit expansion of the cell array.

20. The battery pack according to claim 1, wherein the second reinforcing plate has a shape which is the same as a shape of each of the cells, and the second reinforcing plate does not have a positive electrode, a negative electrode, or a separator, and wherein the second reinforcing plate is directly adhered to the cells on both sides thereof by the structural adhesive without any intervening spacer between the second reinforcing plate and the cells.

21. An electric vehicle, comprising the battery pack according to claim 1.

* * * * *